Sept. 29, 1964  R. S. MACKAY ETAL  3,150,520
TONOMETER
Filed July 7, 1961
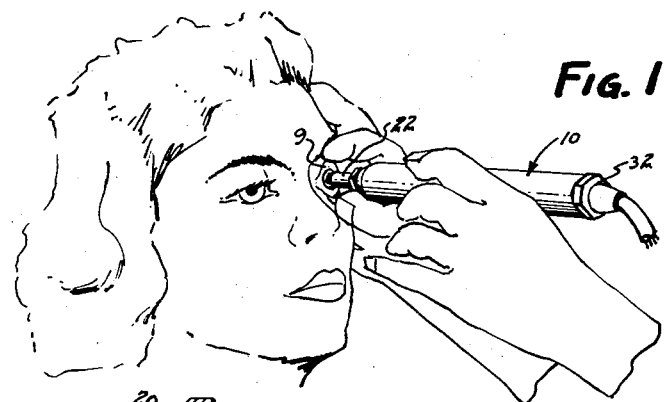
FIG. 1
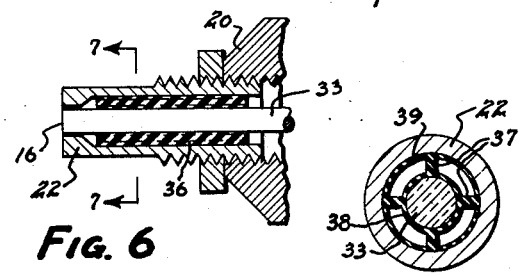
FIG. 6  FIG. 7  FIG. 2
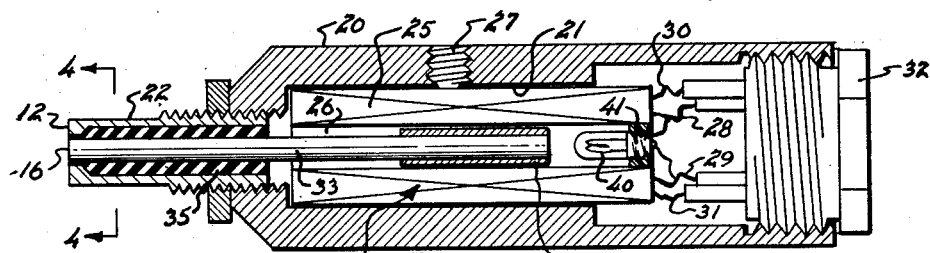
FIG. 3
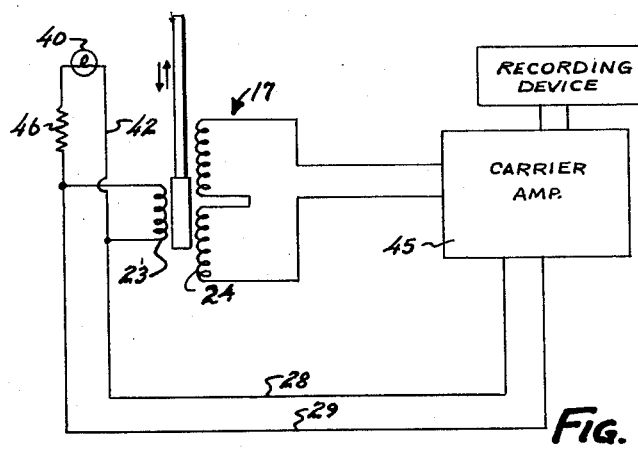
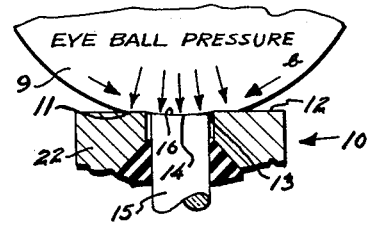
FIG. 4
INVENTORS
RALPH S. MACKAY
ELWIN MARG
RAYMOND W. OECHSLI
FIG. 5
ATTY.

United States Patent Office 3,150,520
Patented Sept. 29, 1964

3,150,520
TONOMETER
Ralph S. Mackay, San Francisco, and Elwin Marg and Raymond W. Oechsli, Berkeley, Calif., assignors to The Regents of the University of California, Berkeley, Calif.
Filed July 7, 1961, Ser. No. 122,438
6 Claims. (Cl. 73—80)

This invention relates to improvements in measuring the internal pressure within spherical objects having a deformable wall structure. More particularly, the invention relates to an improved tonometer for rapidly and accurately measuring intraocular pressure, i.e., the pressure within a human eyeball. This application is a continuation-in-part of our copending application Serial No. 821,254 filed on June 18, 1959, now abandoned.

Intraocular pressure is measured in the diagnosis and treatment of glaucoma, a disease characterized by abnormally high pressure within the eyeball, which if it persists, leads to irreversible blindness. Tonometers have long been used to measure intraocular pressure, but heretofore they have been crude and relatively inaccurate instruments which could be successfully operated only by one having a high degree of skill. This limited performance of the prior-art tonometers has presented a serious problem since, without a consistently accurate tonometer, glaucoma cannot be detected in its early stages, when the intraocular pressure may have increased only slightly over normal.

To illustrate some of the serious disadvantgaes of the prior art devices a briew review of the classic tonometers will be made. Basically, there were two types, namely, the indentation type best exemplified by the well-known Schiøtz and Mueller tonometers and the aplanation type exemplified by the Goldmann tonometer.

The Schiøtz tonometers and the Mueller tonometer both measure the actual indentation of the cornea by a plunger which is pressed under a fixed force directly against the eyeball. The patient must be placed under anesthetic and only a highly skilled operator can successfully and safely manipulate the plunger. In the Schiøtz tonometer the indentation is read mechanically, while Mueller employs an electrical detection system to determine the force of indentation. The high degree of skill required to operate the indentation type of tonometer and the obvious discomfort to the patient, which necessitates an anesthetic, are disadvantages. Moreover, the indentation type of tonometer is also inherently inaccurate, and cannot ordinarily detect pressures below 5 mm. Hg. These prior art devices do not directly determine the internal eyeball pressure, but rather the indentation of the eyeball, and the user has to compensate in some way for such factors as corneal elasticity, scleral rigidity, and other structural characteristics of the eyeball such as the astigmatic corneal surface and individual differences in corneal curvature. Users of indentation type devices attempt to compensate for these factors by the use of sets of calibrated curves adapted for different plunger weights, but this indirect method of measurement has never been sufficiently accurate.

The second classic type of tonometer, that of Goldmann, measured the amount of force required to flatten a given area on the surface of the eyeball. While an improvement over the indentation type, the Goldmann tonometer was still inaccurate, for the unique structural factors of each individual eyeball such as corneal elasticity, surface tension of tears, and disparity in eyeball shape significantly influenced the readings and led to unpredictable and uncompensatable errors, by affecting the force required to flatten the eyeball. Other disadvantages of Goldmann's device are that the patient must be in an upright position and must be given anesthetic, because it takes a long time to take a measurement by Goldmann's tonometer.

The present invention has overcome the disadvantages of the classic prior-art tonometers and has solved the problem of providing a fast yet consistently accurate measurement of intraocular pressure while eliminating the extraneous error factors which heretofore prevented accurate pressure measurements. No indentation of the eyeball is necessary, and the pressure measurement is obtained during a fast but light and gentle contact with the eyeball which momentarily flattens a portion of its surface.

An important and unique principle of our invention which makes possible the above operational advantages, is that of providing a probe-like instrument having a flat pressure plate surrounding a normally co-planar pressure sensitive member which can be pressed gently against the eyeball to flatten a small area of it to obtain the intraocular pressure. With this novel method, an accurate reading of intraocular pressure can be taken and recorded since the bending forces of the cornea are no longer pushing on the central pressure-sensitive member but only on the surrounding, non-sensitive, co-planar area. Thus, the need for calibration and other error compensating devices for corneal deformation has been eliminated and our invention measures directly the internal eyeball pressure. In addition, the surface tension forces of tears are also avoided as an artifact in the pressure reading. Corneal astigmatism is of no consequence since only the pressure from the central part of the flattened area is registered. Also, the factors of eye size, condition of the epithelium, and ocular rigidity do not affect the accuracy of our tonometer. Since it has a smooth contact surface, the tonometer probe tip of our invention can be covered by a thin rubber film (receptacle-end condom) to prevent the transfer of infectious eye diseases from one patient to another.

A particular object of the present invention is to provide an improved tonometer having the aforementioned operational advantages but with reduced internal complexity affording increased reliability and accuracy. Our invention has solved this problem by providing a tonometer comprising a novel combination of elements including central pressure-sensitive element that requires only a slight deflection to measure the intraocular pressure and a novel suspension means for the element that eliminates the need for a complex electronic feedback system to reposition it during or after each measurement. Increased accuracy and reduction of complexity is thus accomplished in our invention because the resiliently mounted element senses pressure electrically as it yields only slightly during contact with the eyeball, thus maintaining essential coplanarity with surrounding fixed pressure plate. The pressure plate thus overcomes the corneal bending forces and the central pressure-sensitive element records only the intraocular pressure. After each application, the central yieldable element is automatically returned to its zero or datum level position of absolute co-planarity with this surrounding pressure plate by the novel suspension means. Because of its unique combination of elements, our improved tonometer can be constructed with a minimum of manufacturing expense while still maintaining a high degree of accuracy.

Another advantage of our invention is that little skill is required to achieve consistently accurate results. Thus, the diagnosis and screening service can be made available to a greater number of people.

Our new tonometers rapidly obtain the eyeball pressure without the need of anesthetics and the patient may be examined in any bodily orientation. Furthermore, the present tonometer requires a contact on the eyeball for only about one second as opposed to much greater times of contact required by the classic tonometers heretofore used. No damage is done to the eye during the pressure measurement even if the measurements are repeated. With the present invention contact is equally effective with all portions of the eyeball, including the cornea, and this is extremely important when corneal sensitivity is a problem.

Other objects, features and advantages of the present invention will be apparent from the following description and from the drawings in which:

FIG. 1 is a view in perspective of a tonometer embodying the principles of the present invention and being used on a patient, where it is about to engage the patient's eyeball.

FIG. 2 is a diagrammatic view in elevation and partly in section of a portion of our new tonometer in contact with an eyeball and flattening it according to the present invention. The various forces resisting deformation are indicated.

FIG. 3 is a view in elevation and in section of a tonometer according to the present invention.

FIG. 4 is an enlarged view in elevation and in section taken along the line 4—4 of FIG. 3.

FIG. 5 is a schematic view of the electrical circuit of a tonometer embodying the principles of the invention.

FIG. 6 is a fragmentary view in elevation and in section of a somewhat modified form of the present invention.

FIG. 7 is an enlarged view in elevation and in section taken along the line 7—7 of FIG. 6.

Broadly considered, the present invention is directed to an improved apparatus for rapidly and accurately measuring intraocular pressure, especially of a human eyeball but also for animal eyeballs. The invention is used, as shown in FIG. 1, by momentarily engaging the patient's eyeball 9 with a probe-type instrument 10.

The engagement of the probe 10 with the eyeball 9, as schematically shown in FIG. 2, entails the momentary flattening of a portion 11 of the eyeball 9, by a substantially flat pressure member 12 on the end of the probe 10, which surrounds a central open area 13. Flattening the eyeball portion 11 overcomes the extraneous forces resisting its deformation, such as the bending forces $b$ of the eyeball wall and the surface tensions of tears. A small surface area 14 of the eyeball 9 exposed at the open center area 13 on the end of the probe 10 then tends to bulge out slightly into the area 13, due solely to the internal eyeball pressure $p$. This pressure is then measured directly, by a unique pressure-sensing device 15 of the present invention located at the open center area 13 and adapted for measuring only the internal eyeball pressure.

The pressure plate 12, generally speaking, may be annular in shape and is mounted on or formed by the end of the cylindrical probe 10. (The term "probe" is here used in the electronic sense, that is, a hand-held contact device that carries a sensing means which transmits the pressure data.) The pressure responsive means or transducer 15 located in the circular center area 13, has a flat surface 16 normally co-planar with the pressure plate 12 and adapted to bear directly against the exposed eyeball surface 14. The force pressing the eye portion 14 outwardly within the center portion 13 of the pressure plate 12 is directly equal to the force created by the intraocular pressure $p$, and through a unique arrangement of elements this force is measured by the pressure-responsive means 15 when the probe 10 is pressed against the eyeball 9.

The present invention is characterized by the use in combination with the above described structural features, of a differential transformer 17 uniquely arranged within the probe 10 and combined with other important elements to form the pressure responsive means 15. The differential transformer 17 in our novel tonometer combination solves the problem of providing a yieldable pressure-sensitive transducer which can engage the eyeball and move only slightly so that, for all practical purposes, it maintains essential co-planarity with the surrounding fixed pressure plate 12 while providing at the same time a highly accurate measure of the intraocular pressure. As will be apparent from the following description, the present tonometer system eliminates the necessity of a complex electronic feedback system and provides not only practical simplicity to the invention but also a high degree of accuracy and reliability in its operation.

In the form of the invention shown in FIG. 3, the probe 10 is comprised of a cylindrical body shell 20 having an internal cavity 21 and connected to a nose piece 22 which is threaded to the forward portion of the body shell 20. Both the body shell 20 and nose piece 22 are preferably made from a nickel steel alloy or some other suitable material having a low temperature coefficient to minimize temperature transients.

The primary and secondary coils 23 and 24 of the differential transformer 17 are wound in a cylindrical package 25 which has a central bore 26 aligned with the probe cavity 21. The package 25 is retained within the body shell 20 by a set screw 27. Lead wires 28 and 29 for the primary coil 23 and lead wires 30 and 31 for the series connected secondary windings 24 extend rearward through a threaded connector fitting 32 which screws into the rear end of the body shell 20.

The nose piece 22 of the probe 10 is formed with the circular opening 13 at its end which is bordered by the annular pressure plate 12. A cylindrical rod 33 having a diameter slightly less than the circular opening 13 in the nose piece 22 extends through the nose piece and into the cavity area 24 within the cylindrical package 25 containing the primary and secondary windings 23 and 24. The rod 33 is preferably made of quartz because this material also has a low temperature coefficient of expansion. The end of the quartz rod 33 extending within the cylindrical winding package 25 is fitted with a sleeve 34 of substantially uniform thickness which is formed from a ferrous metal material and which thus comprises the core for the differential transformer 17.

The quartz rod 33 is mounted within the probe 10 by means of a potted rubber suspension 35 in the nose piece 22. This suspension 35 is an important feature of the present invention since it holds the rod 33 suspended in a fixed position within the probe body 20. Yet the elasticity of the suspension 35 allows the rod to move slightly when the probe 10 is engaged with the eyeball 9 so that the transformer core 34 will also move slightly relative to the windings 23 and 24 and initiate an electrical signal from the differential transformer 17. When a pressure reading is made and the tonometer 10 is removed from the eyeball 9, the resiliency of the rubber suspension 35 around the rod 33 returns it to its normal position with its flat end 16 absolutely co-planar with the surrounding pressure plate 12.

In constructing the tonometer 10 the quartz rod 33 is held absolutely co-planar with the annular pressure plate 12 of the nose piece 22 and, with the rod 33 in this position, it is bonded to the inside surface of the nose piece 22 by the rubber suspension 35. We have discovered that the rubber suspension 35 may be formed conveniently by means of a room temperature catalyzing silicone rubber material (e.g., Dow Corning TRV–502), which is poured in around the rod 33 and allowed to polymerize with the rod in its co-planar position. The rubber suspension 35 in this form is completely solid between the quartz rod 33 and the nose piece 22 and provides a mounting for the rod 33 that never requires any adjustment. The rod 33 thus remains completely resilient within the probe 10 and responsive to pressure applied to its end face 16.

As shown in FIGS. 6 and 7, the rod 33 may be mounted within a rubber suspension 36 which is not completely solid but which is formed having radial fins 37 connecting an inner sleeve 38 around the rod 33 and an outer sleeve 39 bonded to the inner walls of the nose piece 22. Any number of fins 37 may be used to connect the sleeves 38 and 39. The suspension 36 also provides a strong, permanent bond between the rod 33 and the nose piece 22, while maintaining the resilient sensitivity of the rod 33 to the pressure on its end 16 when the probe 10 is pressed against an eyeball.

It is important to provide sufficient light on the patient's eyeball when measurements are taken, and it is preferable that this light be concentrated at a low intensity directly on the eyeball area being tested. This problem is solved in the present tonometer 10 as shown in FIG. 3, by placing a small light bulb 40, commonly known as a "grain of wheat" lamp at the rear end of the transformer coil package 25. The lamp 40 provides a beam of light that passes completely through the quartz rod 33 and is directed on the patient's eyeball when a reading is to be taken. To orient the light bulb 40 properly relative to the rod 33, it is preferably mounted within a cylindrical bushing 41 made of some suitable non-conductive plastic material which fits within the bore 26 of the transformer package 25. The light bulb 40 is then connected by leads 42 to the incoming leads 28, 29 of the primary winding 23 of the transformer 17.

The circuit diagram of the tonometer 10 of the present invention is shown in FIG. 5. As described above, the probe 10 contains the differential transformer 17 having the single primary and the secondary coils 23 and 24 arranged in a cylindrical package 25 having a central bore in which is located the ferrite core 34 attached to the quartz rod 33. To provide an input signal to the differential transformer 17, the primary coil 23 is connected by leads 28 and 29 to a suitable signal generating device such as a "strain gauge" type of carrier amplifier 45. Similarly the secondary coils 24, arranged in series are connected to the carrier amplifier 45 by the leads 30 and 31. The lead 42 containing the lamp 40 and a voltage controlling resistance 46 is connected across the leads 28, 29 to the primary coil 23. The carrier amplifier 45 is also connected to a suitable recording device 47 such as a conventional pen-writer so that tracings of the amplified output signal from the differential transformer 17, proportional to the intraocular pressure, can be made for analysis.

It is believed that the function and operation of our improved tonometer will be apparent from the consideration of the foregoing description, but briefly it may be stated as follows: the excitation current is supplied by the carrier amplifier 45 (e.g., 4.5 volts at 2400 cycles per second) through the leads 28, 29 to the primary coil 23. When the flat contact end 16 of the quartz rod 33 is absolutely co-planar with the annular pressure plate 12 of the nose piece 22 the ferrite core 34 is so located relative to the transformer package 25 and primary and secondary windings 23 and 24 that the coefficient of coupling and inductance is the same between the primary 23 and each half of the secondary winding 24. When the probe 10 is pressed against an eyeball 9 the pressure exerted on the nose 19 of the quartz rod 33 moves the rod 33 slightly within the nose piece 22 hence moving the ferrite core 34 relative to the transformer windings 23 and 24. This movement of the ferrite core 34 is actually but a few microns but it is sufficient to change the coefficient of coupling between the primary and the secondary windings 23 and 24 and to produce an electrical output signal back to the carrier amplifier 45. The signal to the amplifier 45 is then amplified and sent to the recording device 47 such as the pen-writer to record a quantitative description of the signal in the form of a tracing which subsequently may be interpreted in terms of intraocular pressure. Other types of recording or electrical measuring devices may, of course, be used to properly evaluate the output signal from the differential transformer 17 in terms of intraocular pressure.

Before putting the tonometer 10 of the present invention into operation, it must, of course, be calibrated so that the amount of movement of the rod 33 and hence the signal produced by the movement of the ferrite core 34 can be measured in terms of intraocular pressure. This calibration procedure can be performed simply during its manufacture by applying the tonometer to a non-rigid sphere having a known, controlled internal pressure. An important feature of our invention is that the nature of its construction prevents the tonometer from getting out of adjustment. For example, the rod 33 is mounted firmly within the nose piece 22 in the potted rubber suspension 35 which affords a strong and rugged, though sensitive and resilient installation. The novel combination of elements within the probe 10 reduces all errors due to temperature, gravity and other factors to a minimum so that readings can be taken rapidly and easily at any orientation of the tonometer with repetitive accuracy.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A probe-like device for measuring the intraocular pressure of an eyeball comprising:

a main body portion having an axially extending cavity;

a forward body portion attached at one end to and axially aligned with said main body portion and having a plane contact surface at its other end, said forward body portion having an elongated internal cavity that is reduced in size at one end to form an opening in said contact surface;

an elongated rod extending axially through said forward body portion and into said main body portion, said rod having a flat face at one end normally positioned coplanar with the said contact surface of said forward body portion and a ferrous metal member attached to its other end within said main body portion;

mounting means of elastomeric material bonded to said rod along a portion of its length within the internal cavity of said forward body portion, said mounting means extending radially from said rod and being also bonded to the inside surface of said forward body portion, thereby supporting said rod in a centrally located position within said connected body portions while also enabling the rod to move axially relative thereto in response to a force resulting from intraocular pressure when the device is pressed against an eyeball, said mounting means also providing means for restoring the end surface of said rod to its coplanar position with the said contact surface of the forward body portion when the device is removed from the eyeball;

and means within said cavity of said main body portion for providing an electrical signal responsive to a change in axial position of said rod and said ferrous metal member relative to said main body, said signal being proportional to the intraocular pressure when the instrument is pressed against an eyeball so that its surface is engaged by the said flat contact surface and the flat end of the rod.

2. The device as described in claim 1 wherein said mounting means comprises a somewhat elongated solid tubular body of elastomeric material bonded to the outer surface of said rod and to the inside surface of the internal cavity of said forward body member.

3. The device as described in claim 1 wherein said mounting means comprises an elastomeric inner sleeve portion bonded to the outer surface of said rod, an outer sleeve portion bonded to the inside surface of the internal cavity of said forward body member, and a plurality of rib members extending radially between said inner and outer sleeve portions.

4. The device as described in claim 1 wherein said mounting means has an end portion extending to the inner end of the opening in said contact surface of said forward body portion for sealing said opening around said rod and preventing the influx of moisture and foreign matter within said forward body portion.

5. A probe-like instrument for measuring the intraocular pressure of an eyeball comprising:

a main body member having an axially extending cavity;

a forward body member having a series of external threads at one end for connecting it with said main body member and a plane transverse contact surface at its other end, said forward body member also having an elongated main bore section extending from its threaded end and connected by a tapered bore section to a short bore section of reduced diameter that forms an opening in said contact surface;

an elongated cylindrical quartz rod extending axially through said forward body member and into said main body member, said rod having a flat face at one end that is normally coplanar with the end contact surface of said forward body member and a ferrous metal member at its other end positioned within said main body member;

an elongated mounting means of elastomeric material bonded to said rod along a portion of its length at its end portion within said forward body member, said mounting means extending radially from said rod and bonded to the inside surface of said forward body member, and thereby supporting said rod axially in a centrally located position within said main body member while also enabling it to move axially relative thereto when the instrument is pressed against an eyeball, said mounting means also providing means for restoring the end surface of said rod to its coplanar position with the said contact surface of the forward body portion when the device is removed from the eyeball;

and a differential transformer means fixed within said cavity of said main body member and around said ferrous metal member on said rod for providing an electrical signal upon a change in axial position of said rod relative to said main body, said signal being proportional to the intraocular pressure when the instrument is pressed against an eyeball so that its surface is engaged by the said flat contact surface and the flat end of the rod.

6. The instrument as described in claim 5 including means for holding said forward body member in a predetermined axial position relative to said main body member thereby controlling the static position of the inner end of said rod relative to said electrical sensing means.

References Cited in the file of this patent
UNITED STATES PATENTS

| | | |
|---|---|---|
| 2,831,478 | Uddenberg et al. | Apr. 22, 1958 |
| 2,964,993 | Witt | Dec. 20, 1960 |
| 2,966,795 | Smyth | Jan. 3, 1961 |